(12) United States Patent
Liau (10) Patent No.: US 8,019,014 B2
(45) Date of Patent: Sep. 13, 2011

(54) PRE-CODING APPARATUS ON ACCOUNT OF ADAPTIVE ESTIMATION

(75) Inventor: Chia-Hung Liau, Yang-Mei Township, Taoyuan County (TW)

(73) Assignee: Chunghwa Telecom Co., Ltd., Taoyuan County (TW)

( * ) Notice: Subject to any disclaimer, the term of this patent is extended or adjusted under 35 U.S.C. 154(b) by 906 days.

(21) Appl. No.: 11/934,099

(22) Filed: Nov. 2, 2007

(65) Prior Publication Data

US 2009/0116581 A1 May 7, 2009

(51) Int. Cl.
*H04K 1/02* (2006.01)
(52) U.S. Cl. ........ 375/296; 375/221; 375/340; 375/346; 375/358; 370/252; 370/332; 455/226.1
(58) Field of Classification Search .................... 375/296
See application file for complete search history.

(56) References Cited

U.S. PATENT DOCUMENTS

| 5,537,443 | A * | 7/1996 | Yoshino et al. | 375/340 |
| 7,746,802 | B2 * | 6/2010 | Suh et al. | 370/252 |
| 2005/0275576 | A1 * | 12/2005 | Fudge et al. | 341/155 |
| 2008/0147762 | A1 * | 6/2008 | Alderson et al. | 708/313 |

* cited by examiner

Primary Examiner — Shuwang Liu
Assistant Examiner — Lihong Yu
(74) Attorney, Agent, or Firm — Ming Chow; Sinorica, LLC (57) ABSTRACT

A pre-coding process and apparatus on account of adaptive estimation is provided, which comprises a plurality of channel state information detectors, a reduction sampler, a plurality of adaptive estimators, an error-estimation averager, and a parallel/serial transducer. The pre-coding implementation of the present apparatus can be divided in an initial stage of acquisition and a following tracking stage. The present invention can be applied to Single-Input Single-Output (SISO) antenna system and Multiple-Input Multiple-Output (MIMO) antenna system, in order to advance the dependability and stability of the system, which also have advantage in further decreasing the complexity, power consumption and cost of the end-user host receiver, easy implementation, and high immunity from channel noise interference.

8 Claims, 7 Drawing Sheets

| b(n-3) | b(n-2) | b(n-1) | $\Delta 0(n)$ |
|---|---|---|---|
| 0 | 0 | 0 | $P1*\Delta 0(n-1)$ |
| 1 | 0 | 0 | $P2*\Delta 0(n-1)$ |
| 0 | 1 | 0 | $Q1*\Delta 0(n-1)$ |
| 1 | 1 | 0 | $Q2*\Delta 0(n-1)$ |
| 1 | 1 | 1 | $P1*\Delta 0(n-1)$ |
| 0 | 1 | 1 | $P2*\Delta 0(n-1)$ |
| 1 | 0 | 1 | $Q1*\Delta 0(n-1)$ |
| 0 | 0 | 1 | $Q2*\Delta 0(n-1)$ |

*FIG. 7*

PRE-CODING APPARATUS ON ACCOUNT OF ADAPTIVE ESTIMATION

BACKGROUND OF THE INVENTION

1. Field of the Invention

The present invention relates to those pre-coding apparatus. More particularly, the present invention relates to those pre-coding apparatus on account of adaptive estimation applied to Single-Input Single-Output, SISO, and Multiple-input Multiple-output, MIMO, antenna system in order to advance the dependability and stability of the system, which also have advantage in further decreasing the complexity, power consumption and cost of the end-user host receiver, easy implementation, and high immunity from channel noise interference.

2. Descriptions of the Related Art

A situation of wireless mobile communication might be influenced by multipath interference, wireless channel fading, frequency offset, phase noise and Additive White Gaussian Noise (AWGN) that leads to detection bit errors. To overcome the influences of wireless channel, the characters of channels should be estimated at the receiver end, and then the technology of digital signal processing should be applied to compensate the influences of wireless channel. Take orthogonal frequency division multiplexing system for example, the channel frequency response in frequency domain should be estimated, in another word, the pulse response distributed in time domain, should be estimated. Since convolution in the time domain corresponds to multiplication in the frequency domain, once the frequency response is estimated, the receive signal can be directly divided by the frequency response, and the channel effect can be suppressed, which above is the so called Zero-Forcing technology that needs a large amount of receiver computation load. As a result, the idea of pre-coding was brought up that the computation can be shifted to the receiver (base station), wherein the stability and efficiency of a system can be increased, and the complexity of the end-user host receiver can be decreased. Similar ideas were mentioned in the following prior art: U.S. Pat. Nos. 6,597,745, 6,928,047, and 7,046,740.

On the other hand, for further advance the capacity and Throughput of the system, the MIMO technology was brought up. In a MIMO system, the pre-coding technology comprises the both advantages of high system capacity and high system efficiency. Similar ideas were mentioned in the following prior art: U.S. Pat. Nos. 6,862,271, 6,912,195 and 7,068,628.

However, the existing domestic technologies are mostly end-user fixed channel estimating instead of pre-coding. As to foreign technologies, yet pre-coding was brought up, it usually employs the more complicated Singular Value Decomposition (SVD), which is not adaptable to the hardware implementation.

The above proves that the aforementioned prior art is still faulty in many aspects, which is not a well-found design and remains to be improved.

The above proves that the aforementioned prior art is still faulty in many aspects, which is not a well-found design and remains to be improved.

In view of the failings derived from the aforementioned prior art, the inventor of the present invention was inclined to improve it, and finally succeeded in developing the present pre-coding apparatus on account of adaptive estimation, wherein a pre-coding process and apparatus on account of adaptive prediction aimed at SISO or MIMO orthogonal frequency division multiplexing antenna system is brought up, which is a pre-coding process and apparatus of high efficiency, high stability and low complexity.

SUMMARY OF THE INVENTION

The primary objective of the present invention is to provide a pre-coding process and apparatus of high efficiency, high stability and low complexity that aimed at SISO or MIMO orthogonal frequency division multiplexing antenna system, being configured to make a transmitter compensate a transmitted signal in advance according to a channel state information from a end-user host receiver, to increase stability and efficiency of a system and decrease complexity of the end-user host receiver.

The pre-coding apparatus on account of adaptive estimation that can reach the aforementioned objectives is the one being configured to make a transmitter compensate a transmitted signal in advance according to a channel state information from a end-user host receiver, to increase stability and efficiency of a system and decrease complexity of the end-user host receiver. The pre-coding technology brought up in the present invention is designed on account of adaptive estimation, which compensate the channel effect in the frequency domain. The apparatus comprises:

(1) a plurality of channel-information detectors, being configured to estimate related parameters of a channel according to a known training sequence transmitted in advance;

(2) a reduction sampler, being configured to modulate number of sampling points of channel state information according to variation frequency of the channel, and properly reduce feedback data that feed back to the transmitter for pre-coding;

(3) a plurality of adaptive estimators, being configured to estimate, code, decode, and compress the channel state information;

(4) an error-estimation averager, being configured to estimate average value of errors according to results of the adaptive estimators; and (5) a parallel/serial transducer, being configured to transduce results of the adaptive estimators in parallel into a serial output for being fed back to the transmitter.

The present invention is able to adjust the reduction sampling points based on the radio channel ambient under the control of adaptive channel estimators to achieve the best balance between the feedback information bit and the estimation accuracy of channel response, and the feedback channel state information is able to completely compensate the channel effect. First, through the training sequence or leading signal transmitted by the transmitter, the receive end can estimate the channel state information; next, channel state information estimation and data compression by the adaptive estimation technology of the present invention; and last, the transmitter can compensate channel effect ahead in use of the feedback channel state information.

BRIEF DESCRIPTION OF THE DRAWINGS

The drawings disclose an illustrative embodiment of the present invention which serves to exemplify the various advantages and objects hereof, and are as follows.

DESCRIPTION OF THE PREFERRED EMBODIMENT

Figure 1:
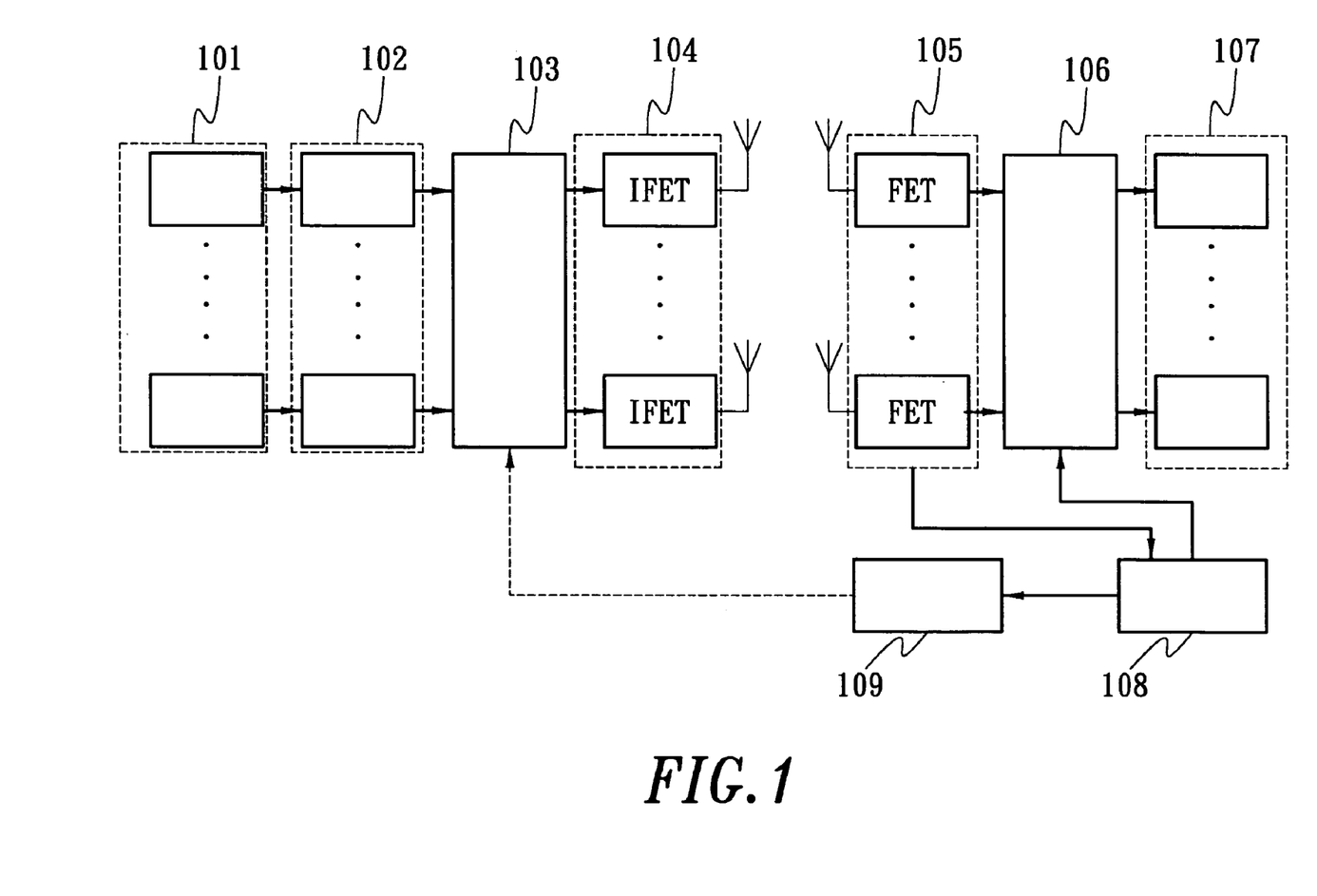
FIG. 1 is a block diagram of the prior art of a Closed Loop SISO orthogonal frequency division multiplexing antenna system.

Referring to FIG. 1, which is a block diagram of the prior art of a closed loop SISO orthogonal frequency division multiplexing antenna system. Pre-coding is a kind of closed loop technology, and SISO orthogonal frequency division multiplexing antenna system is an exception of MIMO orthogonal frequency division multiplexing antenna system. Given that there are Ns parallel original data 101 to be transmitted, these original data 101 will be processed ahead by Ns independent channel coding and the modulation coding scheme (MCS) 102, which refers to using different coding rate and modulation technology, making more flexible use of the channel resources depending on the channel state. Next, these Ns parallel data should enter pre-coding block 103, processing pre-coding according to the channel state information feedback from the end-user host receiver. As a result, besides the Ns parallel data, the pre-coding block 103 also input the channel state information feedback from the end-user host receiver. Processed by the pre-coding block 103, the output Nt parallel data are corresponding to Nt antennas, wherein Nt is great than or equal to Ns. Afterwards, these Nt parallel data are orthogonal frequency division multiplexing processed, transforming signals from frequency domain to time domain by inverse Fast Fourier Transform (IFFT) 104. At last, the signals are transmitted through Nt antennas after front-end process of transmitting, At the receive end, Nr antennas will receive the signals, wherein generally Nr is equal to Ns. After front-end process of receiving, it will process synchronization and frequency compensation. Afterwards, Nt parallel data will be processed through orthogonal frequency division multiplexing process, transducing the signals from time domain to frequency domain by Fast Fourier Transform (IFFT) 105. The output of Fast Fourier Transform (IFFT) 105 will access channel estimation block 108 to retrieve the channel state information, which generally relies on the a known training sequence and leading signal transmitted by the transmitter. Next, the estimated channel state information is inputted to the feedback coding block 109 for compressing and coding the feedback information. Meanwhile, in the MIMO receiver block 106, the estimated channel state information is also used for the coherent detection of Ns parallel data, and at last, decoding and detecting the original data are executed in the signal detection block, in which any possible error occurring in the process of transmission can also be corrected in this block. If Ns=Nt=Nr=1, then the MIMO system becomes SISO system.

Figure 2:
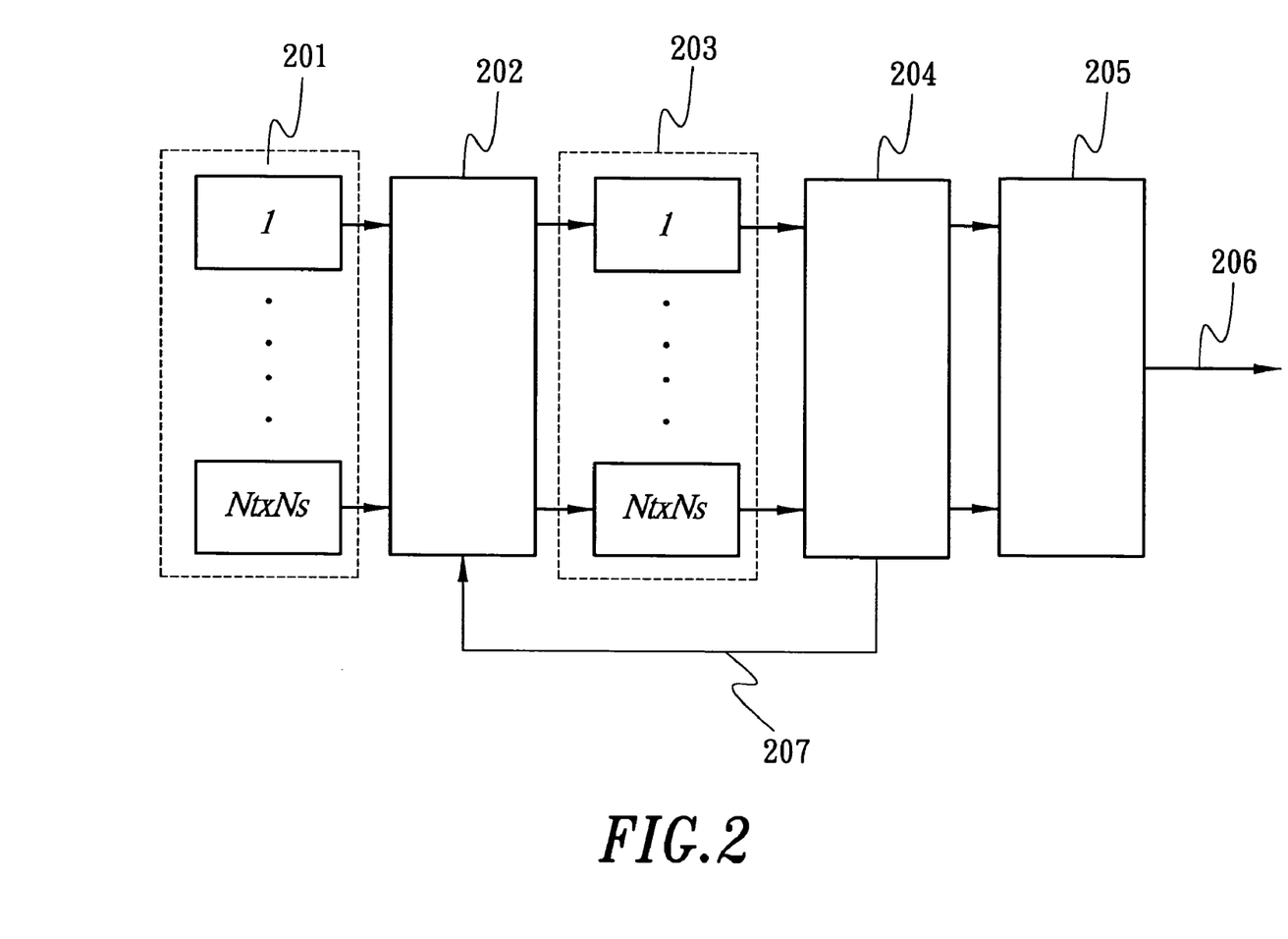
FIG. 2 is a block diagram of a pre-coding apparatus of the pre-coding process and apparatus on account of adaptive estimation.

Referring to FIG. 2, showing a block diagram of a pre-coding process and apparatus of the pre-coding process and apparatus on account of adaptive estimation, corresponding to the feedback coding block 109 in FIG. 1. The block diagram of the pre-coding apparatus comprises: a plurality of channel state information detectors (CSI) 201, a reduction sampler 202, a plurality of adaptive estimators 203, an error-estimation averager 204, and a parallel/serial transducer 205. The apparatus thereof operates with the training sequence and leading signal transmitted by the transmitter passing through the channel state information detectors 201 to estimate the channel state information. For the orthogonal frequency division multiplexing system, the channel state information is the channel frequency response; for the MIMO antenna system with Nt transmitting antennas and Nr receiving antennas, the number of channel frequency response at each sampling time point is equal to Nt×Nr. Afterwards, these channel frequency response are sent to the reduction sampler 202 in order to decrease the sampling frequency or the sampling points so that the amount of pre-coding feedback information can be decreased as well. For a MIMO antenna system, if the original ith transmitting antenna and the jth receiving antenna's channel frequency response is $H0_{i,j}(n)$, then signal $Hd_{i,j}(n)$ processed by the reduction sampler will present as in equation (1):

$$Hd_{i,j}(n) = H0_{i,j}(Mn), 0 \le n \le \left\lfloor \frac{N}{M} \right\rfloor, 1 \le M \le N. \quad (1)$$

in which M is a reduction sampling parameter, and the greater the M is, the fewer the sampling points will be, and the less the sampling resolution will be so; N is a orthogonal frequency division multiplexing symbol or the length of FFT; $\lfloor X \rfloor$ represents a greatest integer no greater than X. If the wireless channel is flat fading, the variation of channel frequency response is slower, which decreases the sampling frequency to save the amount of pre-coding feedback information. Generally, in such circumstances, the reduction sampling parameter M can be greater than 16. If the wireless channel is Frequency selective fading, the variation of channel frequency response is faster, thus a higher sampling frequency is needed in order to obtain a more accurate channel frequency response estimation, wherein generally the effect of saving the amount of pre-coding feedback information is less, and the sampling parameter M is less than 4.

Figure 3:
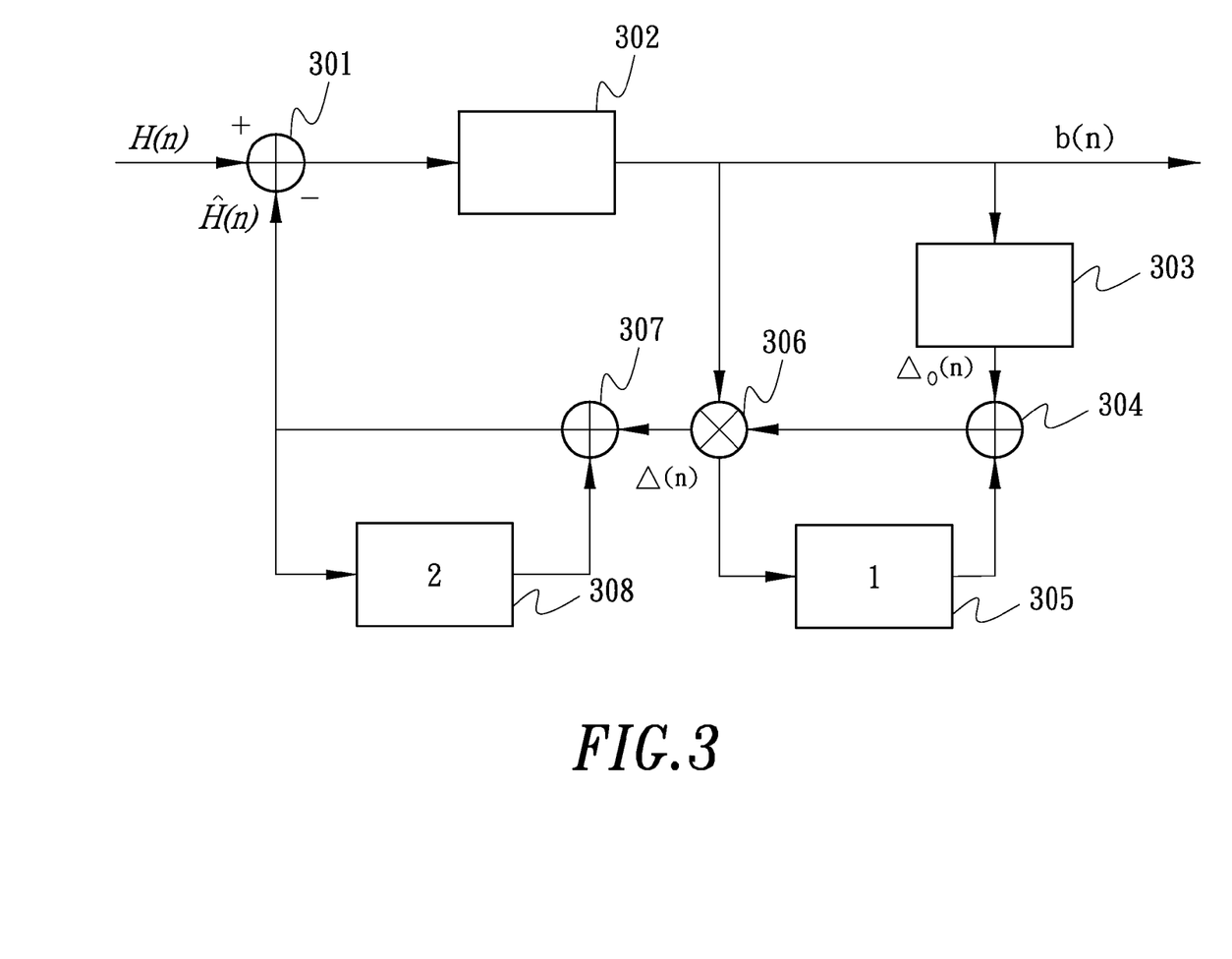
FIG. 3 is a block diagram of a end-user host adaptive estimator (coder) of the pre-coding process and apparatus on account of adaptive estimation.
Figure 4:
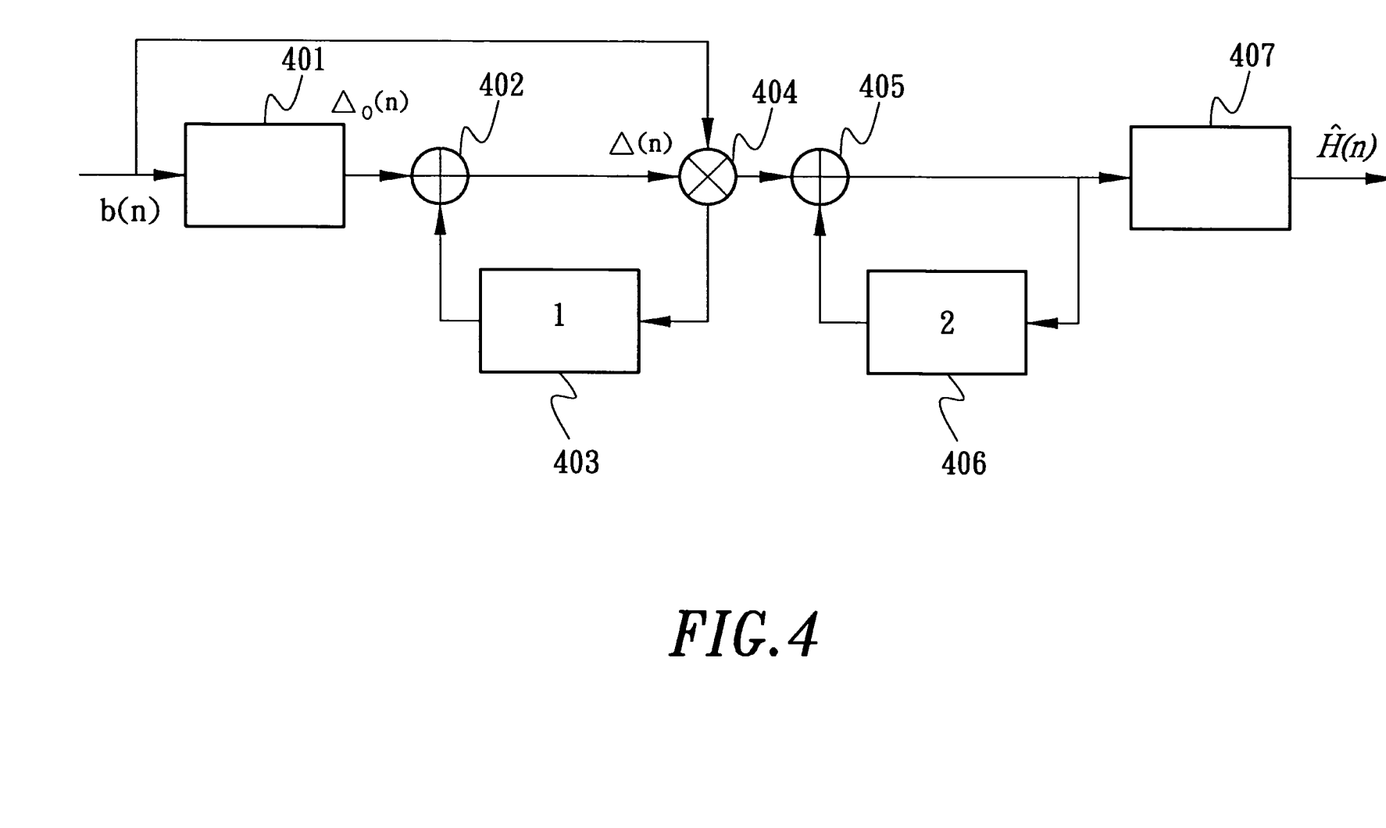
FIG. 4 is a block diagram of a end-user host adaptive estimator (decoder) of the pre-coding process and apparatus on account of adaptive estimation.

The channel frequency response after reduction sampling would be inputted to the adaptive estimator 203 to process estimation, coding and compression of the channel state information. Referring to FIG. 3 and FIG. 4, FIG. 3 is a block diagram of the adaptive estimator (coder) of the end-user host of the present invention, comprising: a subtractor 301, a decision unit 302, a step resolver 303, adders 304, 307, an adaptive filter 1 305, a multiplier 306, and an adaptive filter 2 308. FIG. 4 is a block diagram of the adaptive estimator (coder) of the base station of the present invention, comprising: step resolver 401, adders 402, 405, an adaptive filter 1 403, a multiplier 404, an adaptive filter 2 406, and a low-pass filter 407. The adaptive filter 203 can be expressed by the following equation (2) as:

$$\hat{H}(n) = \sum_{j=1}^{P} a_j(n)\hat{H}(n-j) + b(n-1)*\Delta(n), \quad (2)$$

wherein $\hat{H}(n)$ is the estimation of channel frequency response of the nth sub-carrier in the orthogonal frequency division multiplexing symbol, P is the order of the adaptive filter, $a_j(n)$ is the jth coefficient of the nth sub-carrier of the adaptive filter, b(n) is the information bit that fed back from the end-user host receiver to the transmitter, in other words, the channel frequency response being coded and compressed, $\Delta(n)$ is the order of the adaptive filter for compensating errors of the estimation. The coefficient $a_j(n)$ of the adaptive filter 2 308 is renewed according to the Steepest Descent Algorithm, as shown in equation (3) as:

$$a_j(n)=\alpha*a_j(n-1)+\beta*(H(n-1)-\hat{H}(n-1))*\hat{H}(n-j), \quad (3)$$

wherein $0<\alpha<1$ and $0<\beta<1$ are two renewed leaky factors of coefficients of the two adaptive filters. To simplifying the computation of the equation (3), the renewing computation of the coefficients of the adaptive filters only applies positive and negative sign of $(H(n-1)-\hat{H}(n-1))$ and $\hat{H}(n-j)$. Therefore the equation (3) can be simplified as equation (4) as:

$$a_j(n) = \alpha*a_j(n-1) + \beta*\text{SIGN}(H(n-1)-\hat{H}(n-1))*\text{SIGN}(\hat{H}(n-j)) \quad (4)$$

$$\text{SIGN}(X) = \begin{cases} 1, & X \geq 0 \\ -1, & X < 0 \end{cases} \quad (5)$$

Figure 7:
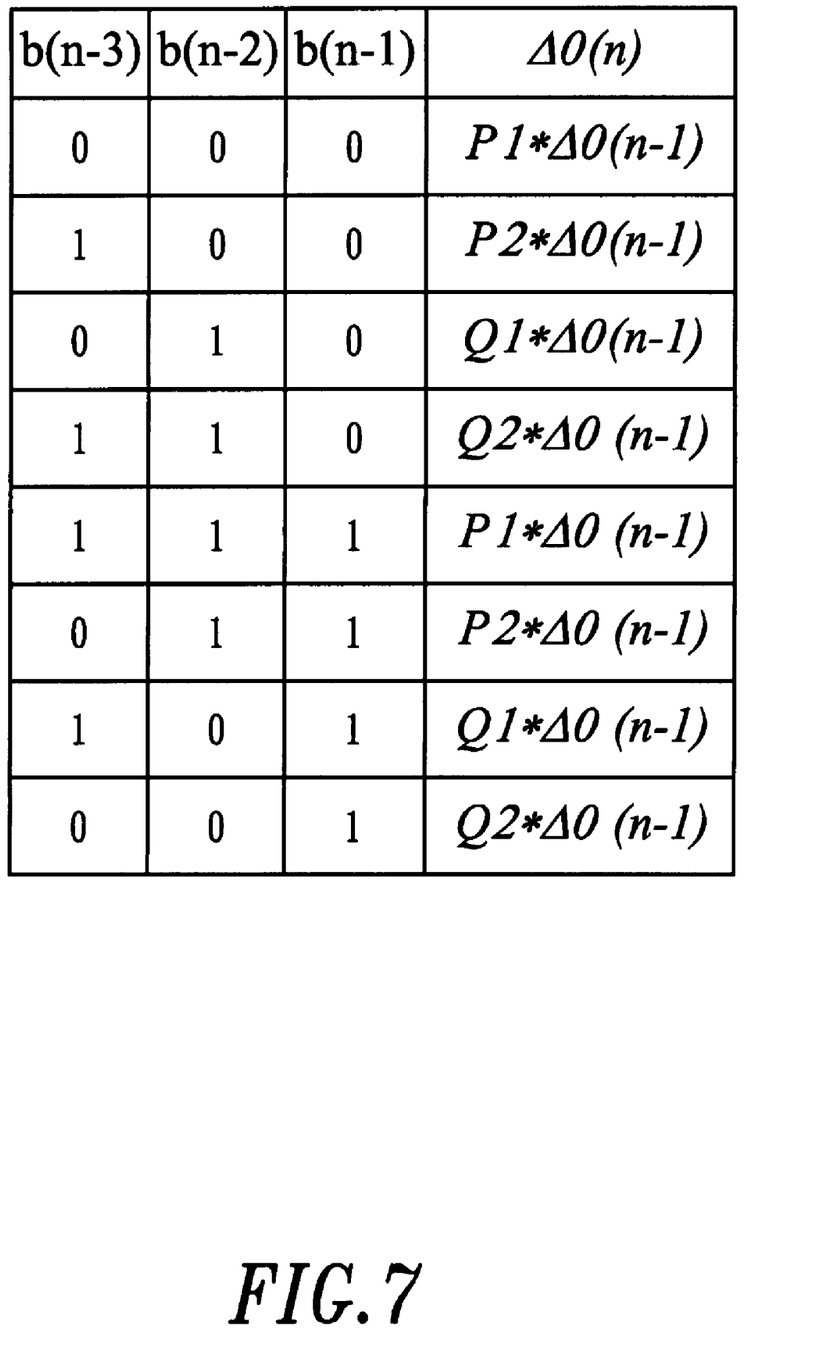
FIG. 7 is a renew table of the adaptive filter step of the adaptive estimation of the pre-coding process and apparatus on account of adaptive estimation.

The $\Delta(n)$ of equation 2 is the order of the adaptive filter for tracking variation of the channel frequency response, and compensating errors of the estimation. The short-time step $\Delta(n)$ is generated according to the rules shown in FIG. 7 and processed by the adaptive filter 1, wherein P1 and P2 are two factors for controlling increase of steps, in which 1<P2<P1. Q1 and Q2 are two factors for controlling decrease of steps, in which 1<Q1<Q2. Finally, the complete step $\Delta(n)$ is generated and denoted as equation (6) as:

$$\Delta(n)=\gamma*\Delta(n-1)+\Delta_0(n), \quad (6)$$

wherein the $0<\gamma<1$ is a constant coefficient of the adaptive filter 1 305.

The feedback information bit b(n) in equation 2 is generated according to the relation between the $\hat{H}(n-1)$ and $H(n-1)$ and shown as:

$$b(n) = \begin{cases} 1, & H(n-1) > \hat{H}(n-1) \\ 0, & H(n-1) < \hat{H}(n-1) \end{cases} \quad (7)$$

In the base station, by inversing steps, the received feedback information bit is inputted to the step estimator and processed by the following adaptive filter to retrieve the estimation of the channel frequency response as shown in FIG. 4. The low-pass filter (LPF) is set behind the adaptive filter and is configured to derive a smoother channel frequency response and avoid sudden variation of the channel frequency response. When the reduction sampling parameter is larger than one, reduced sampling points are restored by an apparatus like a low-pass filter with Interpolation method. Generally, a low-level adaptive filter (N<4) is sufficient to retrieve good estimation of channel frequency response.

According to the present invention, the channel frequency response estimation will access the error-estimation averager 204 to estimate average value of errors. If the average value of estimated errors is greater than the pre-defined threshold, the error-estimation averager 204 will give an instruction to the reduction sampler 202 for increasing sampling points, thus the accuracy of channel frequency response estimation can be advanced by increasing sampling points. If the average value of estimated errors is still greater than the prior defined threshold, increasing sampling points should be remained until the average value of estimated errors become less than the prior defined threshold. At last, the parallel feedback information bits are transduced to serial output through the parallel/serial transducer 205 in order to be transmitted back to the transmit end through a plurality of antennas. As to the SISO antenna system, the processing of this block is unnecessary.

Figure 5:
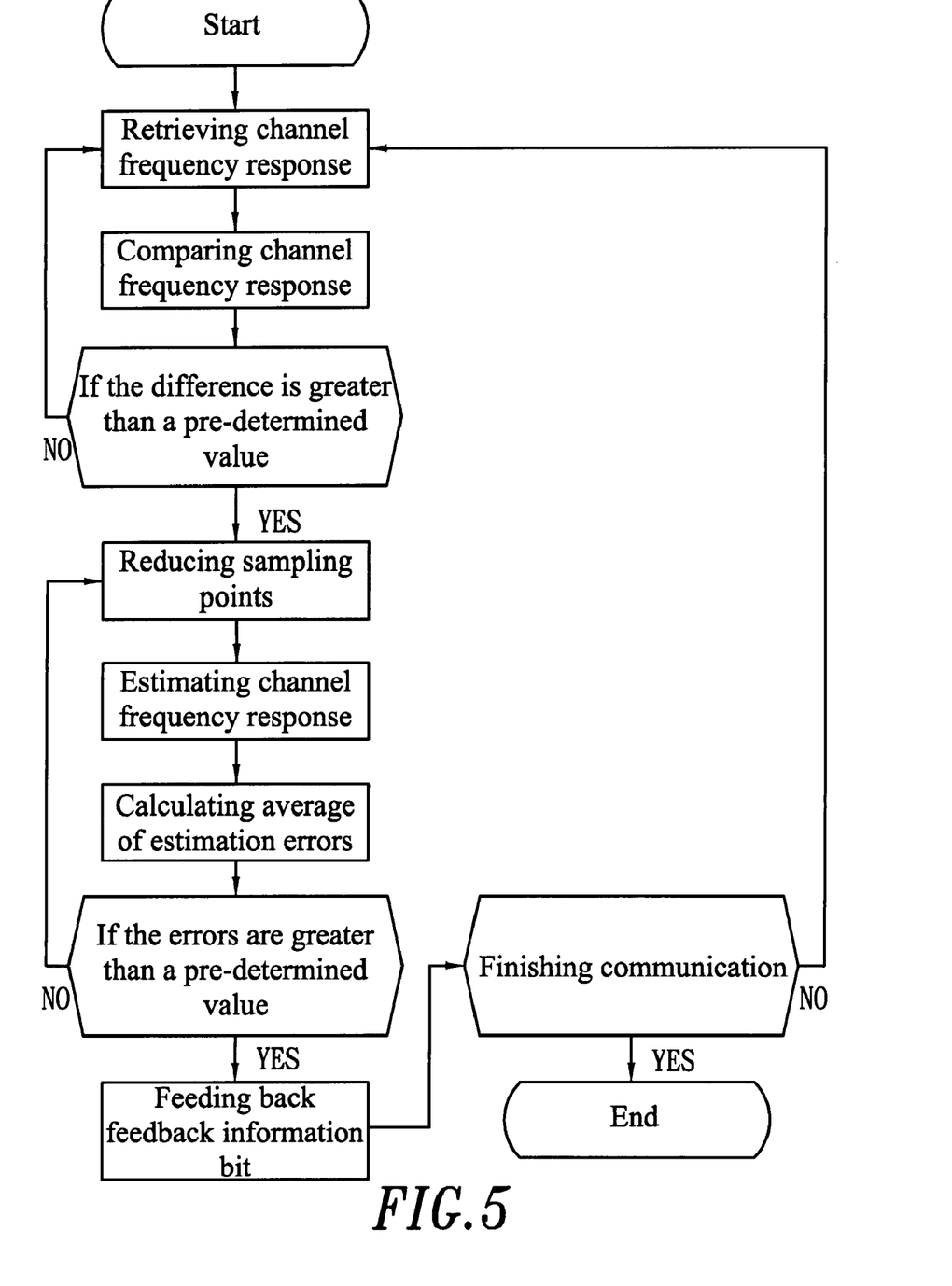
FIG. 5 is a flowchart of the pre-coding process of the end-user host adaptive estimation of the pre-coding process and apparatus on account of adaptive estimation.
Figure 6:
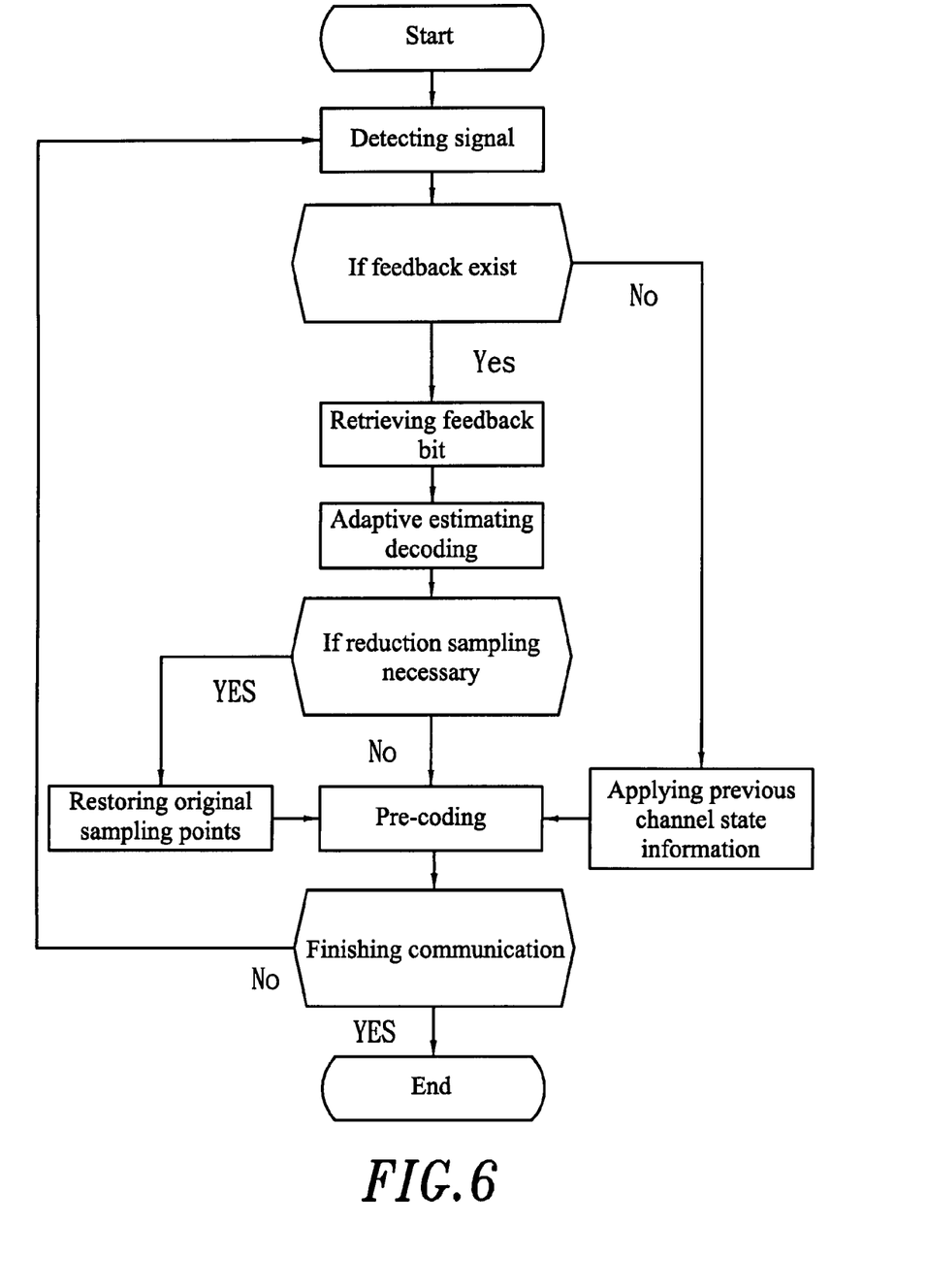
FIG. 6 is a flowchart of the pre-coding process of the base station adaptive estimation of the pre-coding process and apparatus on account of adaptive estimation.

For an orthogonal frequency division multiplexing system with SISO or MIMO antenna, the present invention provides embodiments of pre-coding method and apparatus on account of adaptive estimation with advantages of high efficiency, high stability, and low complexity as shown in FIG. 5 and FIG. 6. FIG. 5 is a flow chart of how the end-user host operates adaptive channel estimation and how the pre-coding apparatus operates, the flow chart comprises steps of:

1. Retrieving the Channel Information from a Decoded Signal

For an orthogonal frequency division multiplexing system, the channel state information is the channel frequency response. Generally, the channel frequency response is retrieved by using a known training sequence or a leading signal transmitted from the base station. If R(n) represents the nth training sequence received by the end-user host, and S(n) represents the nth training sequence transmitted by the base station, then the R(n) in the orthogonal frequency division multiplexing system is denoted as:

$$R(n)=H(n)*S(n)+W(n), \quad (8)$$

wherein the H(n) represents the desired estimated channel frequency response, and W(n) represents background noise. By applying Maximum likelihood, ML, algorithm or Minimum Mean Squared Error, MMSE, algorithm, the channel state information is retrieved as follows:

$$H_{ML}(n) = \frac{R(n)}{S(n)} \quad (9)$$

$$H_{MMSE}(n) = \frac{SNR}{(\sigma_H^2 + SNR)} \frac{R(n)}{S(n)}, \quad (10)$$

wherein the Signal-to-Noise Ratio, SNR, represent the ratio of signal and noise, and $\sigma_H^2$ represents channel gain. Therefore the channel frequency response is able to be retrieved by the equation (9) or (10) for the following adaptive estimation, data compression, and coding.

2. Comparing a Present Orthogonal Frequency Division Multiplexing Symbol with a Latest Feedback Orthogonal Frequency Division Multiplexing Symbol in Difference of Channel Frequency Response Generally, the difference of channel frequency response of two adjacent orthogonal frequency division multiplexing bits is small, therefore it is not necessary to feed back channel frequency response of every orthogonal frequency division multiplexing bit. In the step, the difference of channel frequency response of the present bit and the latest feedback orthogonal frequency division multiplexing bit is denoted as equation (11) as:

$$\varepsilon = \frac{1}{N}\sum_{n=0}^{N-1} |H(n) - H_0(n)|^2, \quad (11)$$

wherein the $\varepsilon$ represents the mean difference of channel frequency response, N is the length of bit, and H(n) and H0(n)

represent the channel frequency response of the present bit and the latest feedback orthogonal frequency division multiplexing bit respectively.

If the mean difference of the channel frequency response is larger than a predetermined value, following estimation and feedback operation are processed, otherwise feedback operation is stopped and the step of retrieving the channel frequency response is re-processed; in practical application, an interval between two feedback operations is fixed to simplified a control signal, such as the interval of 10 micro-second 3. Processing Reduction of Sampling Points When the following estimation and feedback operation are decided to process, processing reduction of sampling points is done in advance to reduce feedback data and save feedback bandwidth. First the reduction sampling parameter is set as the maximum possible value, then setting is done according to different environments. If the sampling parameter is reduced to be 64, that means estimation and feeding back are processed after every 64 points.

4. Processing Estimation of Channel Frequency Response

The estimation $\hat{H}(n)$ of channel frequency response is composed of the sum of the adaptive filter 2 308 and the step $\Delta(n)$. The adaptive filter 2 308 estimates the present channel frequency response by the estimated channel frequency response, and the estimation mode is as shown in equation (2). The parameters of equation (2) are generated and renewed as shown in equations (3) to (5). The higher the order of adaptive filter is, the more accurate the estimation is, as well as the complexity goes high. On the contrary, the lower the order of adaptive filter is, the less accurate the estimation is, as well as the complexity goes low. Generally, the order of the adaptive filter 2 308 is properly to be 1 to 4 to accurately estimate the channel frequency response. Since the channel frequency response varies with the frequency, it's necessary to add the step $\Delta(n)$ on the output of the adaptive filter 2 308. The step $\Delta(n)$ comprises two parts, one part is $\Delta_0(n)$ of short-term variation of step determined by the step generator 303, and another part is the long-term variation of step determined by the adaptive filter 1 305. The sum of the two parts construes the step $\Delta(n)$. The step $\Delta(n)$ has to be multiplied by the previous feedback information bit to compensate in correct direction. Finally, the subtracter 301 is configured to subtract an estimation value from the retrieved channel frequency response, and the subtracting result is inputted to the decision unit 302 for deciding the feedback information bit. The decision mode is as shown in the equation (7).

5. Calculating an Average Value of Errors of Estimations

After estimating the channel frequency response, the step of calculating an average value of errors of estimations is executed, and the average value 207 is shown as:

$$MSE = \frac{M}{N} \sum_{n=0}^{N/M-1} |H(nM) - \hat{H}(n)|^2, \quad (12)$$

wherein the MSE represents the average value of errors of estimations, M represents reduction sampling parameter. By the average value of errors of estimations, it is able to know the accuracy of the estimation of channel frequency response, as well as to be a reference for determining whether reduction sampling parameter is necessary.

6. Feeding Back a Feedback Information Bit of Pre-Coding

The step is executed to compare the average value of errors with a predetermined value, in which when the average value of errors is larger than the predetermined value, the step 3 is re-executed; otherwise the feedback information bit is fed back. If the communication is not finished, then the flow goes back to the step 1 and repeats the aforementioned steps. Otherwise, the adaptive channel estimation and the pre-coding are finished.

The aforementioned method and apparatus are able to applied in a SISO antenna system or a MIMO antenna system. For the MIMO antenna system, channel frequency response of each channel has to be processed separately. If there are Nt transmitting antennas and Nr receiving antennas, the there would be Nt×Nr channel frequency responses.

FIG. 6 illustrates a flow chart of how the base station operates adaptive channel estimation and how the pre-coding apparatus operates, the flow chart comprises steps of:

1. Detecting an Upstream

The step is executed to check whether there is a pre-coding information bit from the end-user host in the detected upstream, wherein the negative checking result means channels of neighboring symbols have small variation, and an used channel frequency response is applied for pre-coding. Or applying a Heterodyne method to estimate the present channel frequency response by previous channel information, and the system effect is improved.

2. Retrieving the Pre-Coding Information Bit

The step is executed to retrieve the pre-coding information bit from the pre-coding information bit fed back from the end-user host when the checking result is positive in the step 1, and process following adaptive estimating decoding.

3. Adaptive Estimating Decoding

The adaptive estimating decoding applies the same principle as the coding, except of the opposite direction of operation. Referring to FIG. 4, first, the pre-coding information bit is inputted into the step estimator 401 to generate a short-term variation of step, $\Delta_0(n)$. On the other hand, the adaptive filter 1 403 is configured to determine long-term variation of a step. Next, the adder 402 is configured to add up the two results of step estimation, and the multiplier is configured to multiply the step estimation by the pre-coding information bit to generate the step estimation $\Delta(n)$. The adaptive filter 2 406 is configured to estimate present channel response according to an estimated channel response, as shown in equation (2), and the present channel response and the step estimation $\Delta(n)$ are added up by the adder 405 to re-build the final channel frequency response. The low-pass filter 407 is set behind the adaptive filter and is configured to derive a smoother channel frequency response and avoid sudden variation of the channel frequency response.

4. Checking Whether the Reduction Sampling Exits

Since the reduction sampling for channel frequency response of the end-user host is necessary, checking whether the reduction sampling exits and the parameters of reduction sampling are needed to restore the original channel frequency response. When a reduction sampling parameter is one that means the sampling of the channel frequency response is not reduced, and the following pre-coding operation is processed; otherwise, when the reduction sampling parameter is larger than one, reduced sampling points are restored by an apparatus like a low-pass filter with Interpolation method. Generally, a low-level adaptive filter (N<4) is sufficient to retrieve good estimation of channel frequency response.

5. Processing Pre-Coding Operation

The step is executed by the pre-coder of the transmitter utilizing the channel frequency response fed back from the end-user host to compensate the channel in advance. Taking a Nt×Nr MIMO antenna system as an example, if the channel frequency response between the ith transmitting antenna and the jth receiving antenna is Hij(n), then the pre-coding result of the original signal Sj(n) is $$\begin{bmatrix} X_1(n) \\ \vdots \\ X_i(n) \\ \vdots \\ X_{N_t}(n) \end{bmatrix} = \begin{bmatrix} H_{11}(n) & \cdots & \cdots & \cdots & H_{1N_r}(n) \\ \vdots & \ddots & \cdots & \cdots & \vdots \\ \vdots & \cdots & H_{ij}(n) & \cdots & \vdots \\ \vdots & \cdots & \cdots & \ddots & \vdots \\ H_{N_t 1}(n) & \cdots & \cdots & \cdots & H_{N_t N_r}(n) \end{bmatrix}^+ \begin{bmatrix} S_1(n) \\ \vdots \\ S_j(n) \\ \vdots \\ S_{N_t}(n) \end{bmatrix}, \quad (13)$$

wherein the Xi(n) represents the pre-coding signal transmitted from the ith transmitting antenna, and the $[H]^+$ represents dummy inverse matrix. If the communication is not finished, then the flow goes back to the step 1 and repeats the aforementioned steps. Otherwise, the adaptive channel estimation and the pre-coding of the base station are finished.

The present invention aims at SISO or MIMO orthogonal frequency division multiplexing antenna systems and brings up a pre-coding method and apparatus on account of adaptive estimation. The present invention is characterized as following:

1. Being able to reduce sampling points according to radio channel ambient and under control of adaptive channel estimator, to get a best balance between the feedback information bit and accuracy of estimation of channel frequency response.

2. Since the feedback channel state information is able to completely compensate the channel effect, it is able to reduce the complexity of the receiver of the end-user host, as well as increase efficiency and stability of the system to get best effect of pre-coding.

3. The present invention provides pre-coding method and apparatus with advantages of high efficiency, high stability, and low complexity As aforementioned, the present invention is novel in technology and advantaged in many effects that the prior arts lack. The present invention conforms to the novelty and non-obviousness of patentability. Please the examiner carefully considering the application of the present invention and allowing the application.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A pre-coding apparatus on account of adaptive estimation, being configured to make a transmitter compensate a transmitted signal in advance according to a channel information from an end-user receiver, to increase stability and efficiency of a communication system and decrease complexity of the end-user receiver, the pre-coding apparatus comprising:

a plurality of channel-information detectors, being configured to estimate the channel information of a channel according to a known training sequence transmitted in advance;

a reduction sampler, being configured to modulate number of sampling points of the channel information according to variation frequency of the channel, and properly reduce feedback data that feed back to the transmitter for pre-coding;

a plurality of adaptive estimators, being configured to estimate, code, decode, and compress the channel information;

an error-estimation averager, being configured to estimate average value of errors of estimations according to results of the adaptive estimators; and a parallel/serial transducer, being configured to transduce results of the adaptive estimators in parallel into a serial output for being fed back to the transmitter, wherein the plurality of adaptive estimators are an adaptive estimating coder of an end-user host and an adaptive estimating decoder of a base station respectively, and the adaptive estimating coder of the end-user host comprises:

an adaptive filter 1, being configured to determine long-term variation of a step, and accepting the steepest-descent algorithm for renewing parameters of the adaptive filter 1 or keeping the parameters constant;

an adaptive filter 2, being configured to estimate present channel response according to an estimated channel response, and accepting the steepest-descent algorithm for renewing parameters of the adaptive filter 2;

a step resolver, being configured to generate short-term variation of the step;

an adder 1, being configured to add up outputs of the adaptive filter 1 and the step resolver to generate two step estimations of the adaptive filter 2 to trace variation of a channel frequency response and compensate inaccuracy of estimation;

a multiplier, being configured to multiply the two step estimations by a previous feedback information bit to compensate correctly;

an adder 2, being configured to add up output of the adaptive filter 2 and the two step estimations of the adaptive filter 2 to generate the estimation of channel frequency response;

a subtracter, being configured to subtract an estimation value from the channel frequency response; and a decision unit, being configured to decide the previous feedback information bit.

2. The pre-coding apparatus on account of adaptive estimation as claimed in claim 1, wherein the channel-information detectors estimate the channel information according to the training sequence or a leading signal transmitted from the transmitter.

3. The pre-coding apparatus on account of adaptive estimation as claimed in claim 1, wherein the reduction sampler adjusts the sampling points of channel frequency response according to different channel information to achieve balance between efficiency and effect, thereby, in a plate channel a larger reduction sampling parameter is applied to achieve feedback information with economized pre-coding; and in a frequency-selective fading channel a smaller reduction sampling parameter is applied to achieve more accurate estimation of channel frequency response.

4. The pre-coding apparatus on account of adaptive estimation as claimed in claim 1, wherein the adaptive estimating decoder of the base station comprises:

an adaptive filter 1 being configured to determine long-term variation of a step, and accepting the steepest-descent algorithm for renewing parameters of the adaptive filter 1 or keeping the parameters constant;

an adaptive filter 2, being configured to estimate present channel response according to an estimated channel response, and accepting the steepest-descent algorithm for renewing parameters of the adaptive filter 2;

a step resolver, being configured to generate short-term variation of step;

an adder 1, being configured to add up outputs of the adaptive filter 1 and the step resolver to generate a step estimation of adaptive filter 2 to trace variation of a channel frequency response and compensate inaccuracy of estimation;

a multiplier, being configured to multiply the step estimation by a previous feedback information bit to compensate correctly;

an adder 2, being configured to add up output of the adaptive filter 2 and the step estimation of the adaptive filter 2 to generate the estimation of channel frequency response; and a low-pass filter, being configured to derive a smoother channel frequency response and avoid sudden variation of the channel frequency response.

5. The pre-coding apparatus on account of adaptive estimation as claimed in claim 1 or 4, wherein the number of steps of the adaptive filter 2 is one to four.

6. A pre-coding method on account of adaptive estimation, comprising steps of providing estimative channel information of a receiver according to a training sequence or a leading signal transmitted from a transmitter; processing estimation and data compression of the estimated channel information by a pre-coding apparatus designed with the adaptive estimation; and transmitting the compressed channel information back to the transmitter for compensation for the channel in advance processed by a pre-coder of the transmitter, wherein the step of using the pre-coding apparatus designed with the adaptive estimation to estimate and compress data comprises methods of adaptive channel estimation and pre-code of an end-user host, and methods of adaptive channel estimation and pre-code of a base station; and the method of adaptive channel estimation and pre-code of the end-user host comprises steps of:

a. retrieving the channel information from a decoded signal, and a channel frequency response from a known training sequence or a leading signal transmitted from the base station;

b. comparing a present symbol with a latest feedback orthogonal frequency division multiplexing symbol in difference of channel frequency response, in which if the difference is larger than a predetermined value, following estimation and feedback operation are processed, otherwise feedback operation is stopped and the step of retrieving the channel frequency response is re-processed; in practical application of hardware, an interval between two feedback operations is fixed to simplified control signal, such as the interval of 10 micro-second, and setting a reduction sampling parameter as the maximum possible value, then setting a duration of responsive time according to different environments;

c. processing reduction of sampling points when the following estimation and feedback operation are decided to process to reduce feedback data and save feedback bandwidth, in which the reduction sampling parameter is set as the maximum possible value, then set according to different environments;

d. processing estimation of channel frequency response by an adaptive estimator of the end-user host;

e. calculating an average value of errors of estimations according to results of the adaptive estimator;

f. feeding back a feedback information bit of pre-coding in response to comparing the average value of errors of estimations with a predetermined value, in which when the average value of errors of estimations is larger than the predetermined value, the step c is re-executed; otherwise the feedback information bit of pre-coding is fed back.

7. The pre-coding method on account of adaptive estimation as claimed in claim 6, wherein the method of retrieving the channel information from the decoded signal employs Maximum Likelihood (ML) algorithm or Minimum Mean Squared Error (MMSE) algorithm.

8. The pre-coding method on account of adaptive estimation as claimed in claim 6, wherein the method of adaptive channel estimation and pre-code of a base station comprises steps of:

a. detecting an upstream to check whether there is a pre-coding information bit from the end-user host in the detected upstream, wherein the negative checking result means channels of neighboring symbols have small variation, and an used channel frequency response is applied for pre-coding;

b. retrieving the pre-coding information bit from the pre-coding information bit fed back form the end-user host when the checking result is positive;

c. processing an adaptive estimating decoding of the pre-coding information bit by an adaptive estimating decoder of the base station;

d. checking whether a reduction sampling exits to restore the channel frequency response, in which when a reduction sampling parameter is one that means the sampling of the channel frequency response is not reduced, and the following pre-coding operation is processed; otherwise, when the reduction sampling parameter is larger than one, reduced sampling points are restored;

e. processing pre-coding operation by the pre-coder of the transmitter utilizing the channel frequency response fed back from the end-user host to compensate the channel in advance.

* * * * *